US010181877B2

(12) United States Patent
Zeine (10) Patent No.: US 10,181,877 B2
(45) Date of Patent: Jan. 15, 2019

(54) SYSTEMS AND METHODS FOR WIRELESS POWER AND COMMUNICATION (71) Applicant: Ossia, Inc., Bellevue, WA (US)

(72) Inventor: Hatem Zeine, Bellevue, WA (US)

(73) Assignee: Ossia Inc., Bellevue, WA (US)

(*) Notice: Subject to any disclaimer, the term of this patent is extended or adjusted under 35 U.S.C. 154(b) by 380 days.

(21) Appl. No.: 14/600,008

(22) Filed: Jan. 19, 2015

(65) Prior Publication Data

US 2015/0207542 A1 Jul. 23, 2015

Related U.S. Application Data (60) Provisional application No. 61/929,922, filed on Jan. 21, 2014.

(51) Int. Cl.
H02J 7/00 (2006.01)
H04B 5/00 (2006.01)
H02J 7/02 (2016.01)
H02J 50/20 (2016.01)
H04W 52/02 (2009.01)
H02J 50/80 (2016.01)
H04W 4/80 (2018.01)

(52) U.S. Cl.
CPC ............ H04B 5/0037 (2013.01); H02J 7/025 (2013.01); H02J 50/20 (2016.02); H02J 50/80 (2016.02); H04B 5/0031 (2013.01); H04W 4/80 (2018.02); H04W 52/0296 (2013.01)

(58) Field of Classification Search
CPC ............ H02J 50/40; H02J 50/80; H02J 7/025
USPC .......................................................... 320/108
See application file for complete search history.

(56) References Cited

U.S. PATENT DOCUMENTS

| 2008/0309452 | A1 | 12/2008 | Zeine |
| 2009/0251309 | A1 | 10/2009 | Yamasuge |
| 2010/0213895 | A1 | 8/2010 | Keating et al. |
| 2010/0225272 | A1 | 9/2010 | Kirby et al. |
| 2010/0315045 | A1* | 12/2010 | Zeine ...................... H02J 7/025 320/137 |
| 2012/0126745 | A1 | 5/2012 | Partovi et al. |
| 2012/0268238 | A1 | 10/2012 | Park et al. |
| 2012/0326660 | A1 | 12/2012 | Lu et al. |
| 2013/0278209 | A1 | 10/2013 | Von Novak, III et al. |
| 2014/0091787 | A1* | 4/2014 | Hyodo .................... G01V 3/105 324/236 |

(Continued)

OTHER PUBLICATIONS

European Patent Application No. 15740306, Supplementary Partial European Search Report, 2 pages, dated Aug. 9, 2017.

Primary Examiner — Nathaniel Pelton (57) ABSTRACT

The present invention relates to systems and methods for a charger which interacts with devices equipped with receivers. The charger may likewise have access to a server via a network connection. The charger receives a beacon signal from the receiver, and transmits power, and a control signal, to the device. Applications enable proper communication between the charger and the receiver. The receiver interprets and effectuates the commands. The receiver also includes sensors which generate data regarding the device status and usage. This data is provided to the server, via the charger. The server maintains a database of all user data collected from the devices, as well as user configurations. The user and third parties may access this data.

13 Claims, 9 Drawing Sheets (56) References Cited

U.S. PATENT DOCUMENTS

2014/0361728 A1* 12/2014 Qian ................. H02J 7/025
                                                                 320/106
2014/0375253 A1* 12/2014 Leabman ............. H02J 7/025
                                                                  320/108

* cited by examiner

SYSTEMS AND METHODS FOR WIRELESS POWER AND COMMUNICATION

CROSS-REFERENCE TO RELATED APPLICATIONS

This non-provisional application claims the benefit of U.S. provisional patent application No. 61/929,922, filed on Jan. 21, 2014, of same title, which application is hereby fully incorporated in its entirety by this reference.

BACKGROUND

The present invention relates to systems and methods for wireless powering and communication with products that typically lack connectivity. This communication enables user control over products, and reporting of product usage and status which enables more efficient product design and novel business models.

Historically, within a residence, power was only hardwired to be supplied to receptacles, and built in lighting. This arrangement required products to either include batteries or be able to plug into receptacles at a home in order to receive power. It became apparent that there are numerous applications where continuous power is desired, but due to access, portability, aesthetics and/or security, wired power cables between the device and a power socket is not advantageous. Examples include security system sensors, smoke/CO detectors, vacuum cleaners and laptops.

In response, many newer structures are being built with wiring for security systems and wired smoke detectors. While this solves the power needs for some applications in newer construction, there are still significant structures that lack this dedicated wiring. Further, as technology advances, additional devices will enter the home that are currently unforeseen, where continuous power supply is desired. Additionally, hardwire-powered devices have the distinct disadvantage of being stationary. In many cases, mobility may be advantageous. For example, cleaning robots, such as the Romba by iRobot, would benefit greatly from a continuous power source which is mobile in nature.

As such, efforts have gone into wireless power transmission systems. These systems typically involve induction or radio frequency transmissions in order to deliver power wirelessly. Traditionally, these systems have proven inefficient and expensive, but with advances in design, more efficient wireless power is becoming more readily available.

The advantages of wireless power are readily apparent: any device that includes a receiver can receive uninterrupted power without the need for batteries or wiring. This enables a far wider range of products to have power capabilities. As previously noted, items like smoke detectors and alarms no longer have to rely upon batteries as their primary power source. However, wireless power transmission further enables items that traditionally are not powered to become active and intelligent.

For example, window blinds in a home commonly are manually adjusted. However, if a compact and cost effective power source were available, blinds could include automated functionality. Such "powered" blinds could open or close via a small motor.

What would make wireless power even more useful to end users is a greater ability to communicate and control products. Returning to the powered blinds example above, by including communication ability to the wireless power receiver, the blinds could be configured to automatically operate in response to lighting, time of the day, or any other pertinent variable. Ideally, a user could even operate the blinds remotely.

It is therefore apparent that an urgent need exists for systems and methods for wireless communication, which leverages wireless power receivers. Such systems and methods enable greater control and monitoring of items, and further enable unique business models.

SUMMARY

To achieve the foregoing and in accordance with the present invention, systems and methods for wireless communication and powering of devices are provided. In particular the systems and methods for wireless power and communication enable the inclusion of receiver units into virtually any physical object. Objects that previously could not be provided a power source due to logistic and/or aesthetic prohibitions are now capable of being monitored and configured for user specific functionality.

In some embodiments, a charger system is present which interacts with one or more devices equipped with receivers. The charger may likewise have access to a server via a network connection. The charger receives a beacon signal from the receiver, and transmits power to the device in response. Power transmission may be via a phased array encapsulated in a dielectric material with orthogonal elements.

The charger may likewise transmit a control signal to the receiver with specific commands or configurations. Applications enabling proper communication between the charger and the receiver may be stored within the charger. A controller within the charger may utilize the application such that the command transmission is in a proper format for the receiver.

Applications may be pre-loaded onto the charger, or may be accessed from an external source. This source may be a server, or another third party (such as the device manufacturer).

The receiver stores the power in a power source. The receiver also interprets the commands that are transmitted, and effectuates the commands. The receiver may also include one or more sensors which generates data regarding the device status and usage. This data may be transmitted to the charger, which is subsequently provided to the server.

The server maintains a database of all user data collected from the devices, as well as user configurations. The server may also analyze the data for user behavior trends and predictions. The user may access this data. Data is typically provided to a user after authentication over an interface. The interface may take the form of a website, or as a mobile application being run on a mobile device.

Further, the data may likewise be provided on either a push or pull basis to other third parties. These third parties may include a marketer, a product designer, a product manufacturer and a research organization.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for wirelessly powering of, and communication with, devices that typically lack connectivity. This communication enables user control over the devices, and reporting of device usage and status which enables more efficient product design and novel business models.

Note that while much of the discussion contained herein relates to devices, it is entirely possible that any physical thing may utilize the disclosed systems and methods. For example, structures (or parts thereof), products, articles, and objects may all be considered "devices" for the purposes of this disclosure. For example, a device may refer equally to a door in a home and an alarm clock.

Figure 1:
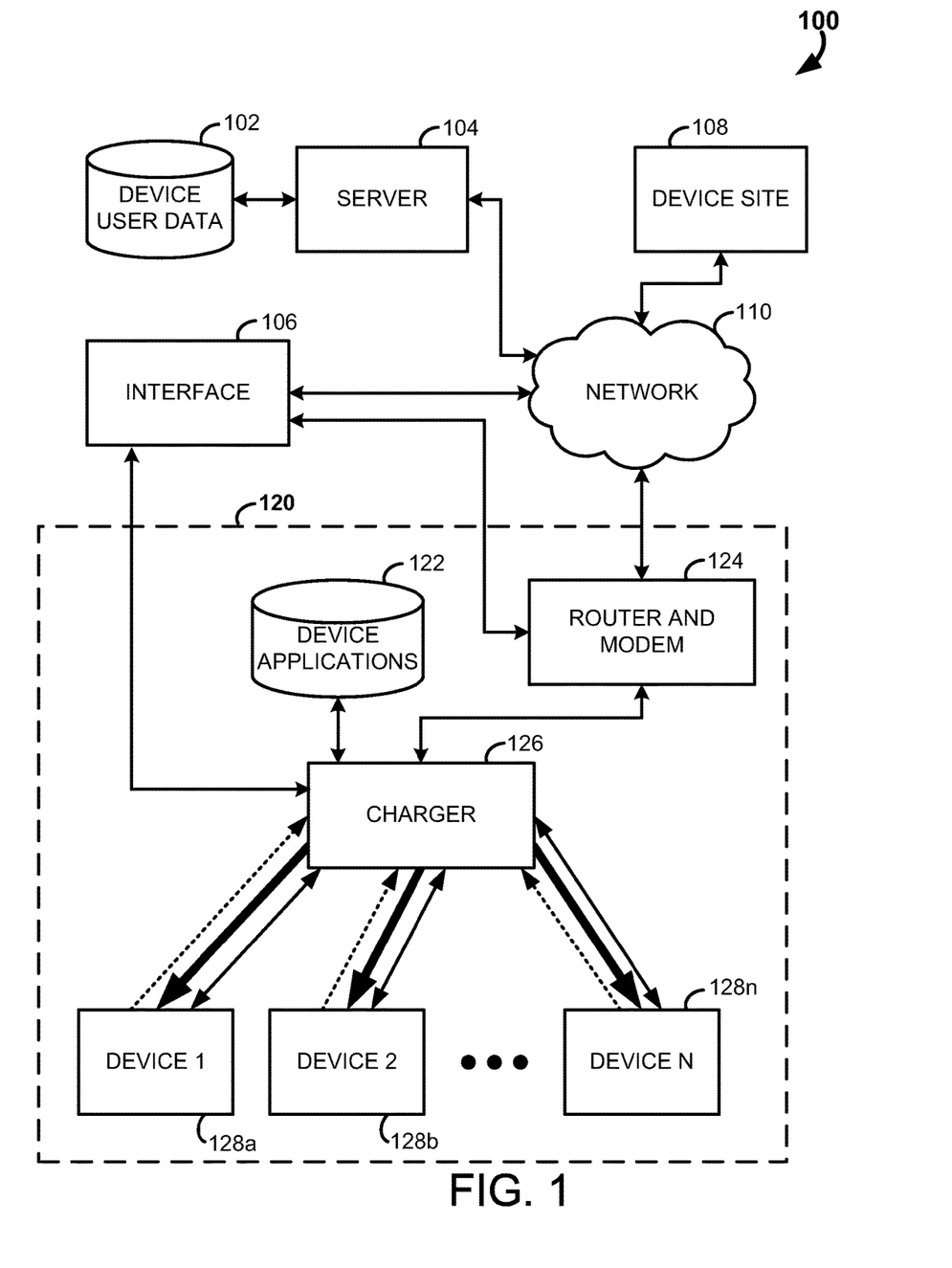
FIG. 1 is an example block diagram of a wireless power and communication systems, in accordance with some embodiments.

To facilitate discussion, FIG. 1 provides an example illustration of a block diagram for the wireless power distribution and communication, shown generally at 100. The system encompasses a local area 120 which may include a residence, commercial or industrial structure, or may merely indicate a range over which the charger 126 is operable. The charger 126 may also be referred to as a "wireless power transmitter", or simply "transmitter".

The charger 126 receives beacon signals (shown as a dotted arrow) from one or more devices 128a-128n. Each of these respective devices 128a-128n includes a receiver unit. The device receivers 128a-128n and charger 126 will be explained in greater detail below in reference to FIGS. 2 and 3, respectively.

In response to the device 128a-128n beacon, the charger 126 may provide a power transmission (shown as a bold arrow). Additionally, one or two way communication may occur between the devices 128a-128n and the charger 126.

In alternate embodiments, multiple charger 126 units may exist within the same local area 120 in order to expand range, increase efficiency, and/or service greater numbers of devices 128a-128n. While any charger type may be employed in the present disclosure, in some particular embodiments, a phased array transmitter may be of particular interest due to its ability to direct power transmissions and thereby increase efficiency. In yet other embodiments, a phased array transmitter may be encased in a suitable dielectric material in orthogonal orientation in order to decrease the charger's physical size. Suitable antenna array architecture for the charger 126 is described in the co-pending application Ser. No. 14/052,828, as well as in U.S. Pat. No. 8,410,953, which are both incorporated herein by reference.

Returning to FIG. 1, unlike any current wireless charging systems, the presently disclosed system also includes the ability for the charger 126 to access a router and/or modem 124 in order to communicate via a network 110. In some embodiments, the network 110 is the internet; however, and suitable wide area network is included as within the scope of this disclosure. For example, the network 110 may also include a cellular network, a corporate network, etc.

In some embodiments, the charger 126 may be enabled to communicate with the network 110 directly without the need of a router/modem 124 using a WiFi repeater, or via another network transmitter. For example, where the network is a cellular network, the charger may include a radio frequency (RF) transmitter enabled to directly communicate with cellular towers.

Connectivity to the network 110 is important for multiple reasons. For example, a third party device manufacturer 108 may be able to access the device data via the charger 126. Accessing device data enables novel business models for device manufacturers, and also may assist device manufacturers (and other third parties such a marketing analytics firms) with the ability to more closely monitor device usage trends, etc. Further, this connectivity may also enable enhanced diagnostics of malfunctioning devices.

In order for the charger 126 and a device 128a-128n to communicate effectively, the charger requires an application to interface with the device. These applications control the behavior and operation of the device 128a-128n receivers. Applications may be preloaded on the charger within a database 122, or may be loaded upon device 128a-128n introduction. For example, a new device may include updates that, when initialized, updates the charger 126 wirelessly with the appropriate application. In alternate embodiments, the device may come with a storage media, such as an optical disk or flash memory card. This memory media may connect with the charger 126 directly, or via a local computer via the router 124 to update the charger's 126 applications.

In yet other embodiments, new applications may be downloaded via the network from the device site 108 directly, or via an application store hosted by a server 104. In some embodiments, the server 104 is provided by the charger 126 manufacturer.

The server 104 may include multiple functions in some of these embodiments. For example, in some cases the server may compile data, within a device user database 102, regarding devices 128a-128n for the user and/or third parties. Device usage patterns, device types, and user information are becoming increasingly valuable to marketing firms and device manufacturers as more devices are outfitted with wireless power and communication. The charger manufacturers may be privy to more information than any other party, and may be able to monetize this information.

Additionally, user usage data may be valued by users as well. This data may enable users to make better purchasing decisions, and may be used to guide behaviors. The server 104 may also act as a repository for applications for devices, thereby enabling chargers 126 to download appropriate applications to enable new devices 128a-128n. Lastly, the server 104 may provide an interface 106 that the user may access remotely for control over devices 128a-128n. Device 128a-128n configuration, direct operation, and triggers may all be set via the interface 106.

In some embodiments the interface 106 may include a mobile application that is downloadable onto a smart phone or tablet. The interface 106 may also include a website that is accessed. Lastly, the interface 106 may also include a local application running on a local computer that controls the charger 126. If a local computing device is used, the communication with the charger 126 may be direct or via the router 124. When the access is remote, the interface 106 may connect to the charger 126 via the network 110. This connection may be direct, but due to the advantages detailed above regarding user data collection, it may be advantageous, in some embodiments, to filter all communications from the user to the charger 126 via the server 104.

Figure 2:
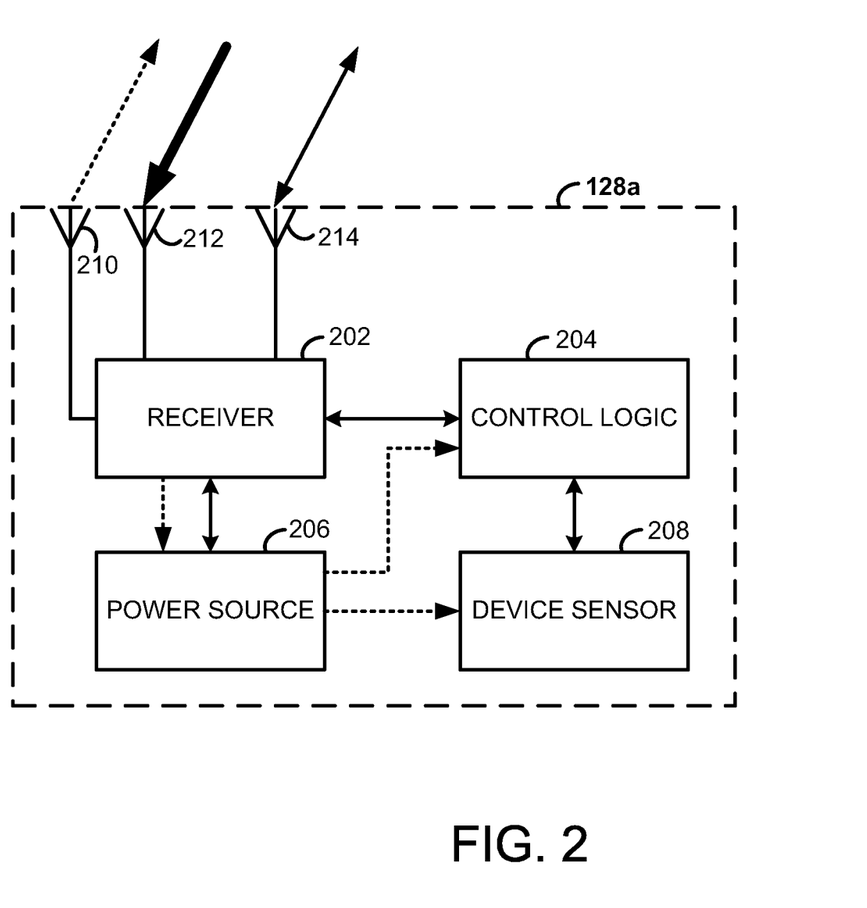
FIG. 2 is an example block diagram of a device receiver, in accordance with some embodiments.

Turning now to FIG. 2, a detailed block diagram is provided for a device 128a receiver, in accordance with some embodiments. Each device 128a-128n that is capable of wireless power and communication requires a receiver as illustrated. Receivers 128a may be sized according to the power requirements of the device. Additionally, receivers 128a may include multiple components on a common chip board, or may even have multiple functionalities within a single chip.

Most notably, the receiver may include one or more antennas to transmit beacons, receive power and communicate. In some embodiments, these antennas may be one single physical component, however due to power requirements, it may be advantageous to have two or even three antennas. For example, the beacon is a short ping of relatively low power, and may benefit from a dedicated antenna 210. In contrast, the antenna 212 for power transfer may operate at a different frequency or gain, and thus may be separate. Lastly, the communication antenna 214 may also benefit from a different frequency and/or gain. If the beacon has directional gain, then the data may need omnidirectional behavior.

The antenna couple to a radio frequency receiver 202, which generates the signals for communication and the beacon, and ensures that incoming power and commands are routed appropriately. Power is provided by way of the dotted line to a batter power source 206 which may store and distribute power as needed to the device itself, and to device sensors 208 and control logic 204 for the device and receiver. Power may be used to drive acoustics, actuators, sensors, videos, transmissions, and virtually any other functionality desired for the given device.

The control logic 204 may include firmware supplied by the device manufacturer. Communication from the charger 126 is routed to the control logic 204, which may also benefit from sensor 208 data. The control logic 204 may then provide commands to the device 128a and/or communicate back information via the receiver 202 and antenna 214.

For example, returning to our powered blinds example from before, assume that the user has configured the blinds to shut after eight o'clock in the evening. The receiver 202 may receive power that is stored in the power source 206. Additionally, the receiver 202 may get periodic time updates from the charger 126. In alternate embodiments an internal clock may be utilized, however for synchronization across multiple devices, a central clock signal from the charger may be preferred.

The configuration for the blinds is stored within the control logic 204. The sensor 208 indicates if the blinds are up or down. When it is eight o'clock, the control logic 204 may check via the sensor 208 whether the blinds are up or down (as the user may have adjusted them during the day), if they are not down, the control logic 204 may cause the power source to supply power to a motor to extend the blinds until the sensor 208 indicates they are fully down. In some embodiments, the control logic 204 may then have this sensor data conveyed back to the charger 126, which may eventually be stored within the server 104.

Figure 3:
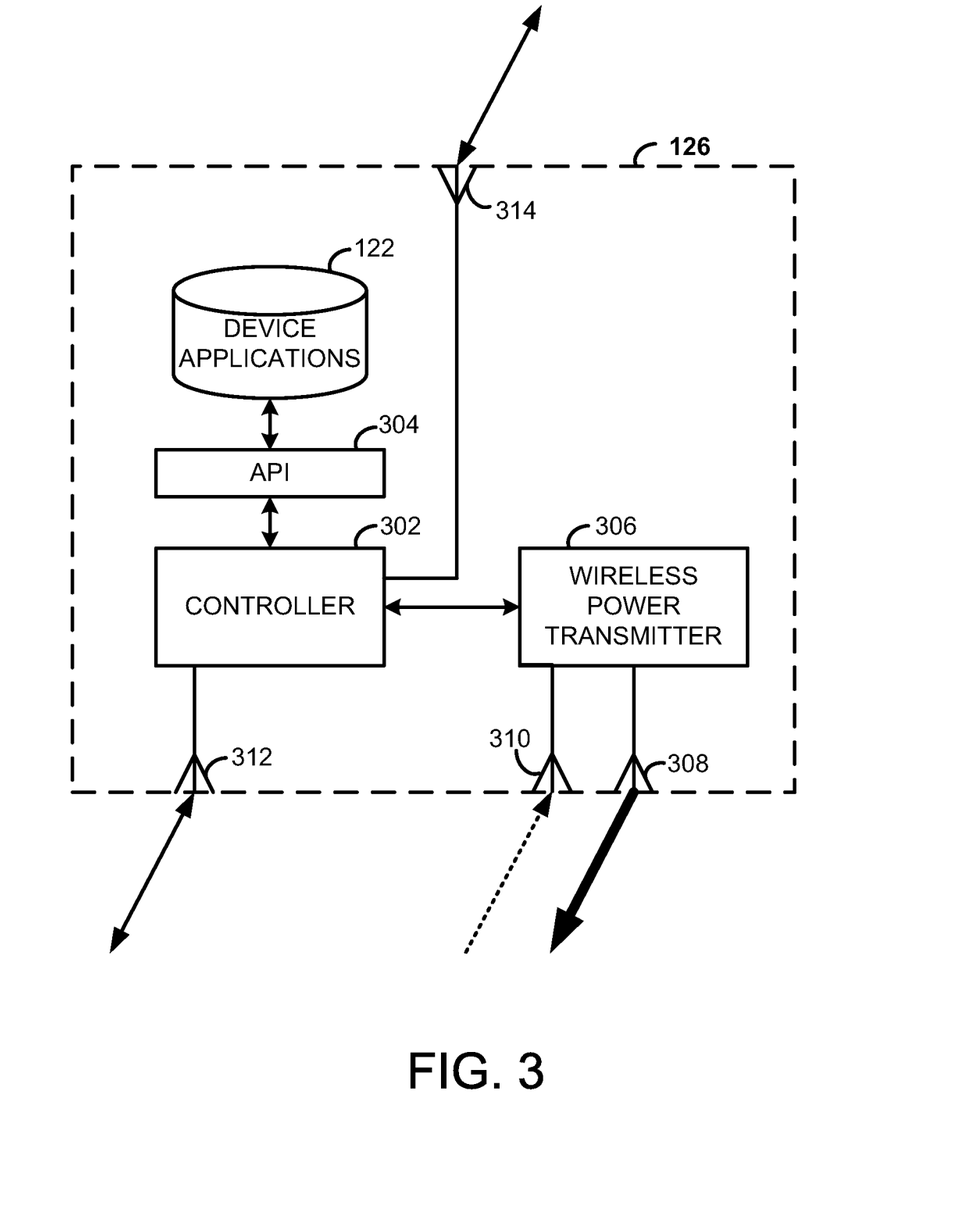
FIG. 3 is an example block diagram of a charger, in accordance with some embodiments.

Moving on to FIG. 3, an example of the charger 126 is provided, in accordance with some embodiments. As with the receiver 128a, the charger 126 may include multiple components on a common chip board, or may even have multiple functionalities within a single chip. Moreover, the charger may also include one or more antennas to receive beacons, transmit power and communicate with devices and a router/modem 124, or even directly with the network 110 or local interfaces 106.

This example charger 126 includes four antennas. Of course, just like the receiver 128a, some or all of these antennas may be combined into a single RF elements, in some embodiments. In alternate embodiments, having separate physical antenna structures is beneficial. The beacon antenna 310 receives a beacon signal from one or more devices 128a-128n. The wireless power transmitter 306 sends a power transmission via a power antenna 308 to the devices. This antenna, as previously discussed, may be a phased array, and in some embodiments may be encapsulated in a dielectric material with orthogonal elements to maximize array efficiency while reducing the charger size.

The power transmitter 306 couples to a controller 302 which may periodically authenticate the device as being eligible for power transmission. Authentication may be performed by referencing the device 128a against a list of allowed devices maintained within the charger (or accessed on the server 104). Device 128a identification may be communicated by the beacon, or via the communication transmissions.

Communications may be received and transmitted between the charger 126 and the devices 128a-128n via a control antenna 312. The controller may leverage device applications on the database 122, via an application interface 304 in order to effectively communicate with the device 128a. Status of the device may be received, and commands/configurations may be transmitted to the device. The controller 302 may be configured to handle many devices 128a-128n at any given time by leveraging multiple applications, as required.

Additionally, the controller, which includes at least one processing circuit, may communicate with local interfaces or with the router via an ancillary antenna 314. In some embodiments, this back channel may include a wired connection. An application programming interface (API) 304 may also enable user control and configuration of the controller 302 when accessed via the ancillary antenna 314.

Now that the basic architecture of the wireless powering and communication system has been described, attention will now be turned to the processes performed or enabled by such systems.

Figure 4:
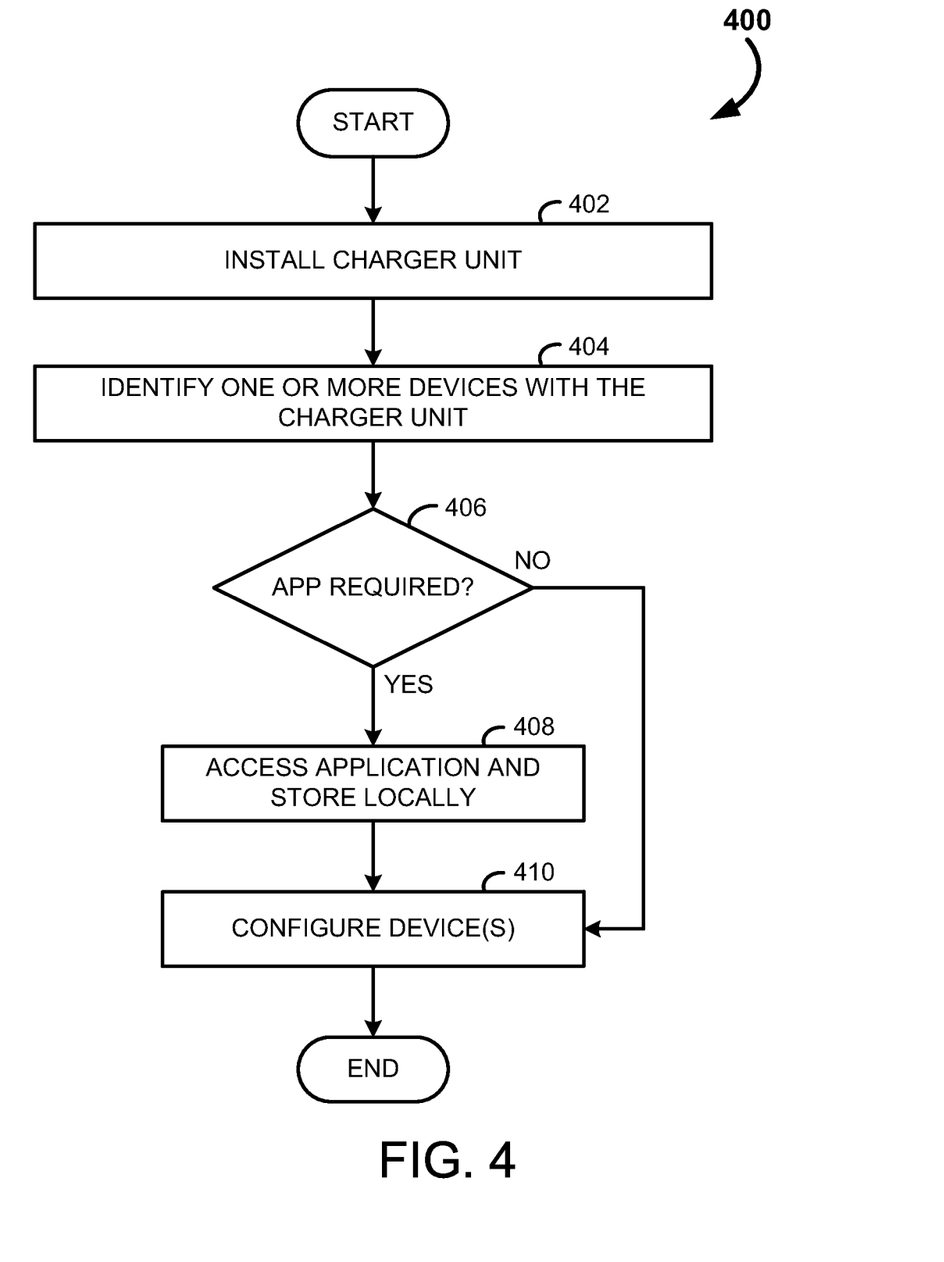
FIG. 4 is an example flowchart for the process of installing a wireless power and communication system, in accordance with some embodiments.

FIG. 4 provides an example flow diagram 400 for the initial installation of the wireless powering and communication system. This process starts with the installation of a charger unit (at 402). Typically this includes providing power to the unit, and linking it to a user account with the server. Connectivity with the router and/or local interfaces may also be advantageous.

Next one or more devices may be identified (at 404). Device identification may be automatic (in response to device beacon), or may include the user specifically registering the device with the charger. Obviously, one skilled in the art could imagine a number of ways to register devices. For example, the user may press a "synch" button on both the charger and device within a short amount of time to one another. In an alternate embodiment, the user may access the charger graphical interface, via the server, where all devices in range are displayed. The user could then select devices which are authentic. In yet other embodiments, the charger may query the user whether a device it has sensed is authentic. This could happen via email or text message, or via notification on the configuration interface.

Once the user has indicated which devices are authentic, the charger may add it's identification to the list of authenticated devices. This list will be leveraged at later times to ensure only approved devices receive control and power transmissions.

The charger next inquires whether an application is needed to communicate and control the device (at 406). In some cases the application may already be stored within the charger (for example if the device is a duplicate, or the application has been pre-loaded on the charger). If the application is not already present, the charger may access the application (at 408) via media, from the device itself, or downloaded from the server or a third party site (depending upon implementation).

After the application has been accessed and stored (or if it was already present), the device may be configured via the charger based upon default configurations, prior configurations by the user, or via new user instructions. For example, returning to our blinds example, if one set of powered blinds has been installed, and the user installs a second set of blinds, the charger already has the relevant application. The blinds manufacturer may include a default configuration that causes the blinds to shut after 24 hours of non use. However, the user has already configured the existing blind set to close at eight o'clock and open at 6 o'clock in the morning. Since user configurations are already present, in some embodiments the system can automatically apply those configurations to the new device.

After configuration of the devices, the process for new installations completes. Of course, additional charger units and devices can be introduced, necessitating all or some of the above steps to be executed.

Figure 5:
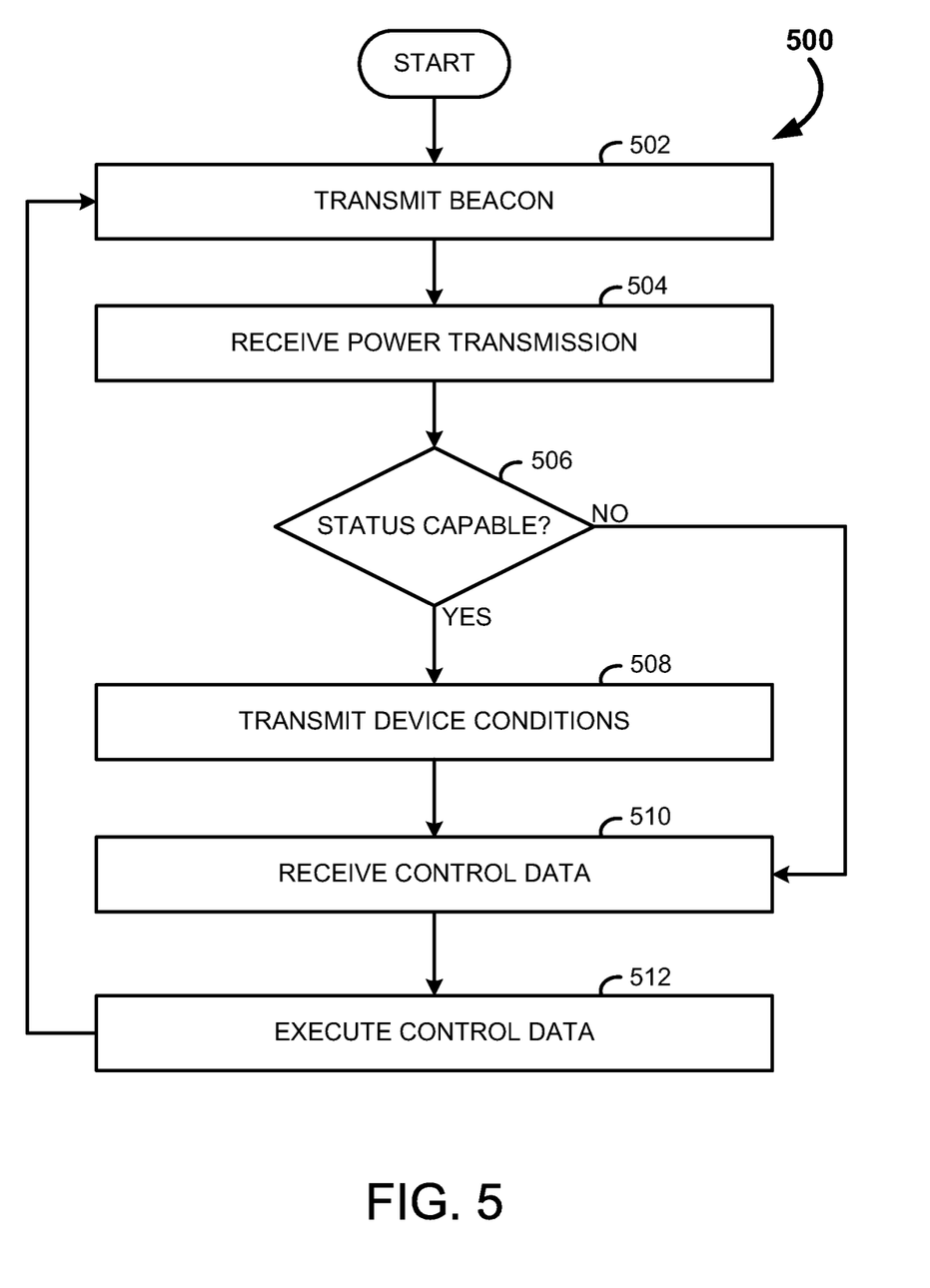
FIG. 5 is an example flowchart for the process of receiving wireless power and communication, in accordance with some embodiments.

FIG. 5 provides an example flowchart for receiver operation (at 500). In this example system, the receiver transmits a beacon (at 502) identifying the device. In response, a power transmission is received (at 504), which enables the device to operate and typically replenishes a battery. If the device includes sensors that monitor the device's status (at 506), then the device is capable of providing device conditions to the charger (at 508). This device data may be employed by the charger to generate controls for the device (at 510). The device data may also be useful to users and third parties. As such this data may be compiled by the server and disseminated accordingly, or may be provided directly to third parties and/or users.

Regardless of whether the device received control data due to a condition of the device, due to external conditions (such as time), or due to user intervention, the control data is then executed (at 512). The device then repeats the process while in an active state.

Figure 6:
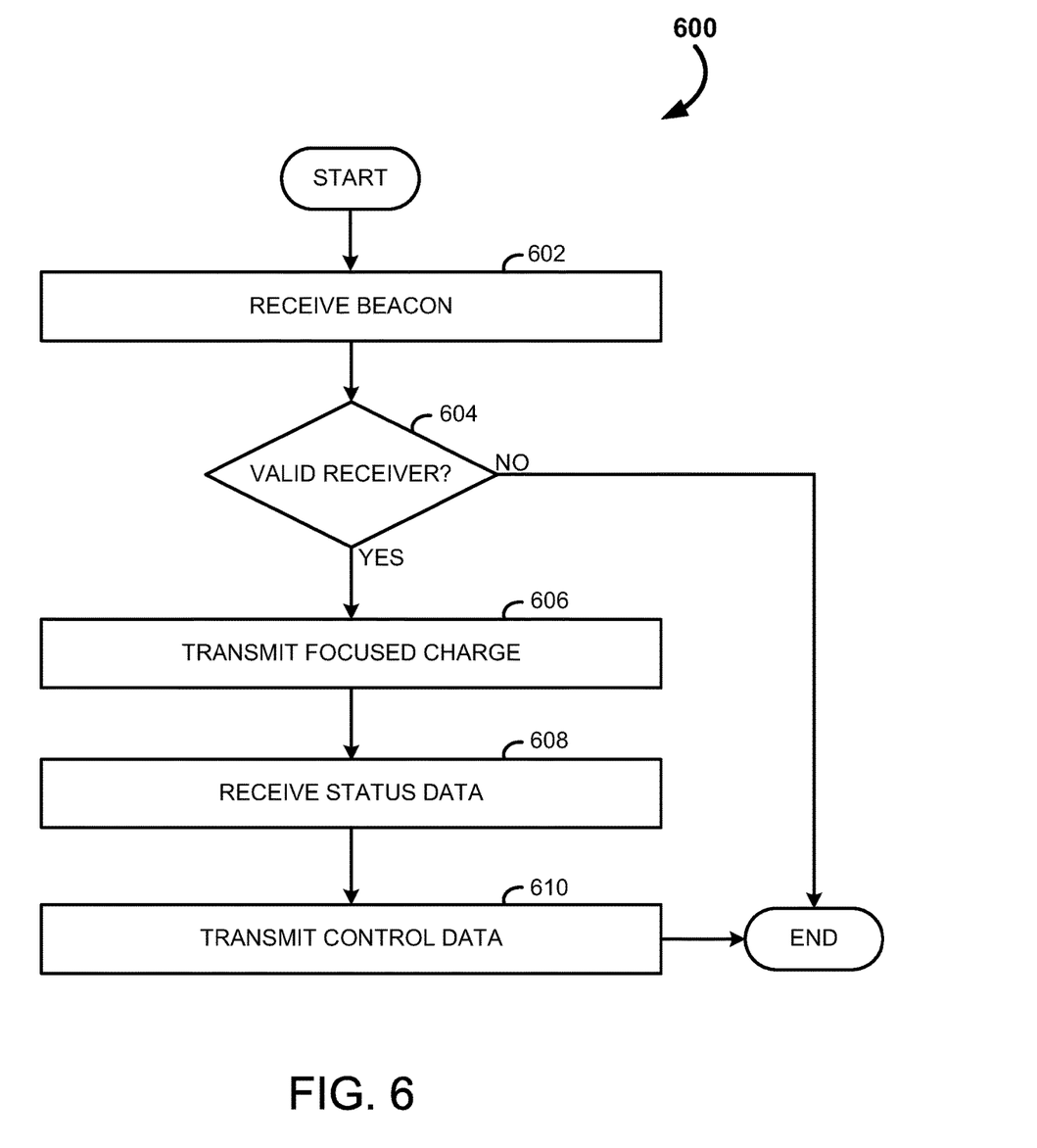
FIG. 6 is an example flowchart for the process of transmitting wireless power and communication, in accordance with some embodiments.

FIG. 6, by comparison, is an example flow chart for the charger operation (at 600). In this example process, the charger first receives the beacon transmission (at 602). The beacon includes an ID for the device. The charger may compare that device ID to a maintained listing of approved IDs in order to authenticate the device (at 604). Device authentication may be performed every time a beacon is received, or may be performed on a periodic basis.

If the device fails authentication, then the process ends. However, if the device properly authenticates, the charger may supply the device with a transmission to replenish power reserves (at 606). Additionally, the charger may receive status data from the device (at 608). In response to the status, or in response to other external factors, the charger may provide control data to the device (at 610). The charger is able to manage multiple devices at one time in this manner.

Figure 7:
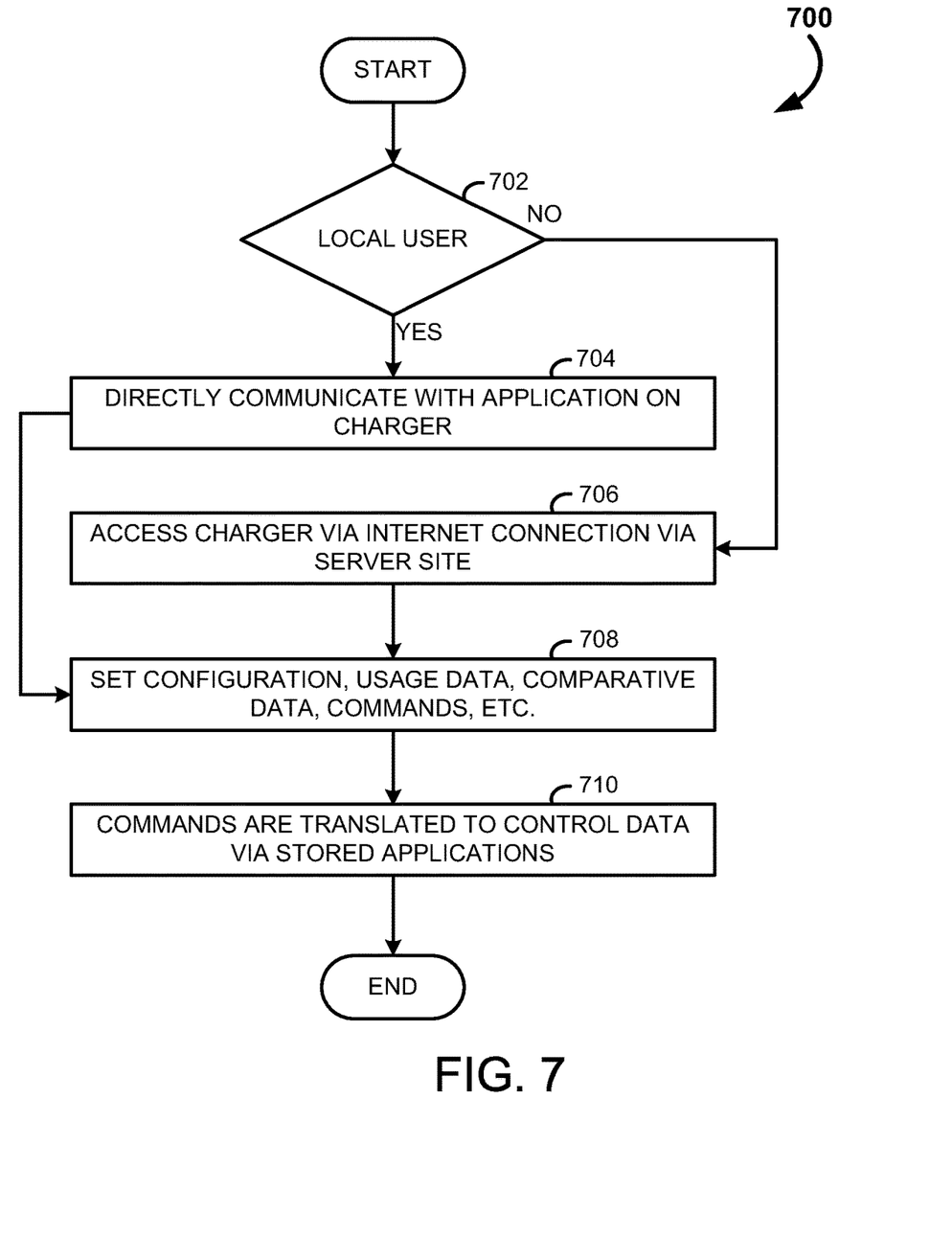
FIG. 7 is an example flowchart for the process of user configuration of a wireless power and communication system, in accordance with some embodiments.

Turning now to FIG. 7, where a flowchart is provided for the user interacting with the system (at 700). In this example process, whether the user is local or not determines how the system operates (at 702). For example, a local user may be able to directly access the charger (at 704) via a built in interface, or through a computing device running an application. Such an application may access the charger via the router, or through a wired or wireless direct connection.

In contrast, remote users may be required to access the charger through the network (at 706). This may include establishing a direct IP connection to the charger, but typically includes accessing an account hosted on the server. The server maintains records of the user's activity, devices, and settings. The user may input the commands they wish into the server's interface (via a smart phone application or a website), and the server then communicates them to the charger.

Regardless of how the user accesses the charger, once accessed, the user may input (at 708) new device configurations, access historical usage data, comparative data against other users, input commands, etc. Lastly, the commands are translated, within the charger, using device specific applications, into control data which is subsequently transmitted to the device (at 710).

Figure 8:
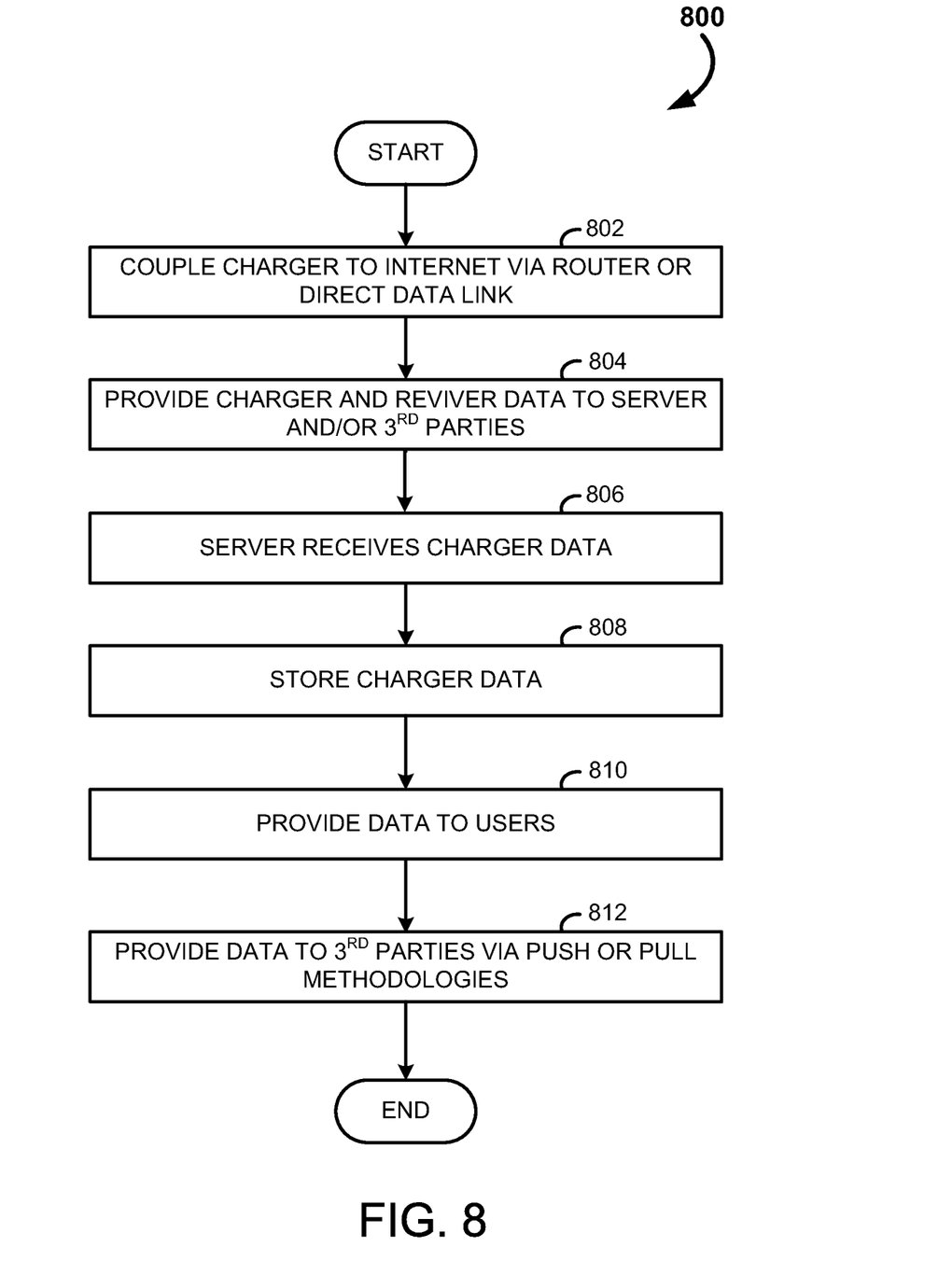
FIG. 8 is an example flowchart for the process of server management of a wireless power and communication system, in accordance with some embodiments.

FIG. 8 provides an example flowchart for the data handling (at 800), in accordance with some embodiments. In this example process the charger is connected to the internet (or other suitable network) via a router and modem, or via a direct link (at 802). This connection allows the charger to send information received from the devices it is connected with. This information may be provided to the server and/or third parties (at 804).

In some embodiments, it is preferable to send the device and charger data to the server. The server receives the data (at 806) and then stores it (at 808). This data may be stored in a raw format, or may be analyzed for trends and modeling of user behaviors. In some embodiments, complicated analytics may be performed on users behaviors, including predictive analysis by comparing user trends to other users with similar behavioral patterns.

Historical use data may be supplied to the users via the interface (at 810) so that the users can see and control data for all device receivers. Additionally, in some embodiments, the server may provide access to use data, and where applicable analytics on behavioral trends and predictions, to interested third parties (at 812). These third parties typically include device manufacturers who can use the data to improve upon device designs. Another interested third party is marketers, who can use the data to develop targeted and relevant marketing campaigns. Other interested third parties include researchers, governmental departments, utility providers, insurance agencies, industry groups, and the like. Data dissemination to these third parties may be performed on a push or pull basis. In some embodiments, data dissemination may be monetized.

Figure 9:
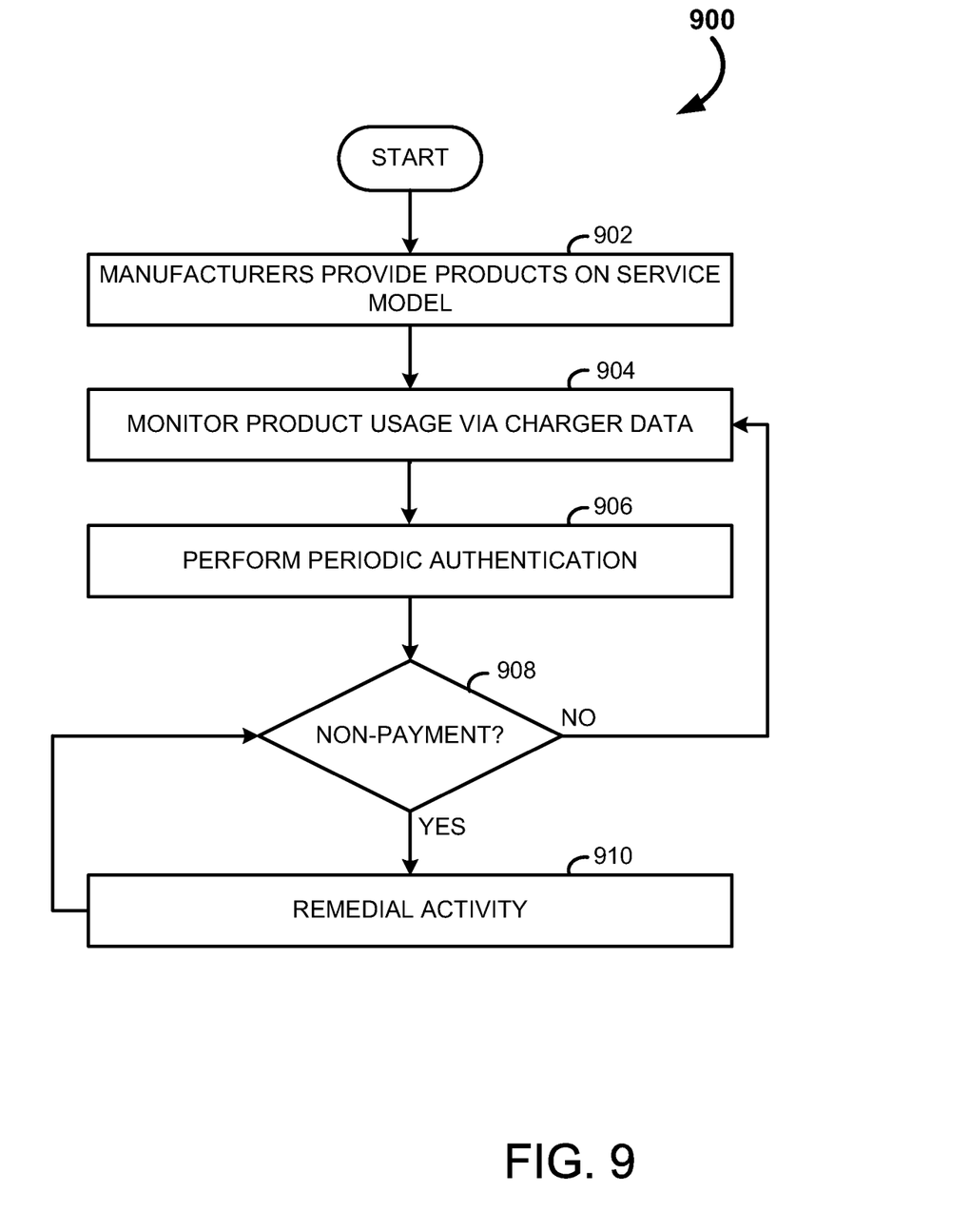
FIG. 9 is an example flowchart for a business model enabled by the wireless power and communication system, in accordance with some embodiments.

Moving on, FIG. 9 provides a business model that is made feasible by device manufacturers via the invention described herein (at 900). The concept of providing something under a lease or license is well known. Large equipment is often leased to end users rather than purchased due to the cost prohibitive nature of purchasing, and the greater control the manufacturer may exert over the article. However, this model tends to break down as the item being licensed or leased is less valuable. This is because monitoring and control over smaller value items has historically been difficult. Physical inspections of the items are cost prohibitive given the relatively low cost of the license.

Of course, there are a few exceptions to this general trend. Where usage and service of an item are relatively easily controlled, such as with cell phones and software, a license or service model becomes economically advantageous. The main advantage to such models is that revenue is spread out over the life of the article. Consumers enjoy this because it results in a lower up-front cost and manufacturers ultimately generate more revenue than under a onetime sale of the item.

By incorporation of a receiver and charger into items that traditionally have not been connected to a communication network, even low value items can also enjoy the benefits of a service type model. This enables manufacturers to offer items to consumers at higher prices to be purchased outright (as normally done), or provide their device to the consumer for a reduced (or even free) price and charge a periodic fee. Since these fees are low, the server may be able to enter into relationships with the device manufacturers, and send the user a consolidated invoice for all services, thereby making payments and billing more efficient and easier from the user's perspective. Of course, the manufacturer could always bill the consumer directly as well.

In this service model process, the manufacturer provides the product on a service model that the user agrees to (at 902). Since the consumer is not purchasing the device outright, additional restrictions may be included in the service contract. The service model could be a monthly flat fee (like a car lease), or may be usage based (like some cell phone plans).

The devices usage may be monitored via the charger data (at 904). Additionally, the charger may periodically perform authentication of the device (at 906) to ensure that the device has not been tampered with. The user can be monitored for non-payment under the service model terms (at 908). As previously mentioned, payments may be directly made to the product supplier (manufacturer or reseller), or may be made via the server for consolidated billing to the consumer. Payments may be made via mobile device, automatic withdrawal, or by any known payment methods.

If payment is properly made, the device continues to be monitored. However, if payment is not made, a control signal may be sent to the device for remedial action (at 910). Such remedial action may include disabling the device, messaging the user, altered performance of the device (slower speeds for example), or the like. The remedial activity may continue until payment has been resumed.

The advantages of a service model extend beyond mere economic advantages to the manufacturer and lower upfront cost for consumers. It also shifts the manufacturers incentive from "planned obsolescence" to "built to last". More durable goods benefit the consumers because they do not need to replace goods as often, and the manufacturer benefits from recurring revenue for a product that has an extended lifetime. By reducing economic waste from premature failure, the total economic picture may be better for both manufacturers and consumers over the life of the product and it may even benefit the environment from avoiding premature failure.

While this disclosure has provided a number of use cases for the disclosed systems and methods of wireless charging and communication, due to complexity and for the sake of brevity, not all natural extensions of the disclosed systems and methods will be enumerated herein. However, any such natural extensions are considered within the scope of the disclosure and are intended to be covered herein. For example, such systems and methods lead to a situation where many or most devices are now controllable by a user. Similar devices could be incorporated into power outlets, circuit breakers, or in power strips to enable some control over even wired devices. This would enable an environment where virtually every powered device may, minimally, be able to be turned on and off remotely. One can envision a situation where a user can turn off a TV or alarm clock while on vacation using the disclosed invention.

In sum, the present invention provides a system and methods for wireless charging and communication. The advantages of such a system include the ability to provide power and monitoring to devices that traditionally were unable to be powered due to necessary mobility, wiring difficulty and aesthetics. Such systems and methods also enable control over the devices due to user preference, configurations, and/or external factors. Data generated from receivers may be useful for users and third parties alike.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A wireless power delivery system comprising:
a first antenna configured to receive a beacon from at least one wireless power receiver integrated with or embedded in an electronic device;
a second antenna configured to transmit wireless power to the at least one wireless power receiver, wherein the at least one wireless power receiver provides at least a portion of the wireless power to the electronic device for operation thereof;
a third antenna configured to send commands to the at least one receiver; and
control circuitry, including one or more processors, configured to:
identify at least one application associated with the electronic device, wherein the application facilitates control of behavioral or operational configurations of the electronic device;
access the at least one application associated with the electronic device; and
generate the commands to send to the at least one wireless power receiver using the at least one application,
wherein the commands, when executed by one or more processors of the at least one wireless power receiver, direct the one or more processors of the at least one wireless power receiver to modify a behavioral or operational configuration of the electronic device.

2. The system of claim 1, further comprising a fourth antenna configured to communicate with a WiFi network.

3. The system of claim 2, wherein the fourth antenna enables a user to access the wireless power delivery system via a network.

4. The system of claim 3, wherein the control circuitry is further configured to:
accept configuration and control data initiated by the user;
wherein the commands are further generated based on the configuration and control data initiated by the user.

5. The system of claim 2, wherein any of the first, third and fourth antenna are embodied within a single antenna.

6. The system of claim 3, further comprising:
a database configured to store applications,
wherein the applications are downloaded via the network from at least one of an external server or an external third-party communication interface.

7. The system of claim 3, wherein the control circuitry is further configured to provide data received from the at least one wireless power receiver to at least one of a server or a third party.

8. The system of claim 1, wherein the control circuitry is further configured to authenticate the at least one wireless power receiver.

9. The system of claim 1, wherein the second antenna is a phased array encapsulated in a dielectric material with orthogonal elements.

10. A wireless power receiver system comprising:
a first antenna configured to transmit a beacon to a wireless power delivery system;
a second antenna configured to receive wireless power from the wireless power delivery system, wherein:
the wireless power receiver system is configured to provide at least a portion of the wireless power to an electronic device for operation thereof, and
the wireless power receiver system is configurable to be integrated with or embedded in the electronic device;
at least one sensor adapted to sense sensor data associated with a status or usage of the electronic device;
a third antenna configured to send the sensor data to the wireless power delivery system and receive commands from the wireless power delivery system; and
a controller, including one or more processors, configured to effectuate the commands wherein the commands, once effectuated, direct the one or more processors of the controller to modify a behavioral or operational configuration of the electronic device.

11. The system of claim 10, further comprising:
a power supply operable to store power received from the wireless power delivery system.

12. The system of claim 11, wherein the controller is further configured to regulate power distribution from the power supply.

13. The system of claim 10, wherein the controller is further configured to regulate power to the device.

* * * * *